UNITED STATES PATENT OFFICE.

EMIL REBER, OF BASEL, SWITZERLAND, ASSIGNOR TO SOCIETY OF CHEMICAL INDUSTRY IN BASLE, OF BASEL, SWITZERLAND.

DYESTUFF OF THE PYRAZOLONE SERIES AND PROCESS OF MAKING SAME.

1,286,411.      Specification of Letters Patent.      Patented Dec. 3, 1918.

No Drawing.      Application filed February 15, 1918. Serial No. 217,340.

*To all whom it may concern:*

Be it known that I, EMIL REBER, a citizen of the Swiss Republic, and resident of Basel, Switzerland, have invented new and useful Dyestuffs of the Pyrazolone Series and Processes of Making Same, of which the following is a full, clear, and exact specification.

In the United States Letters Patent No. 1210808, dated January 2, 1917 and No. 1,270,325, dated June 25, 1918, are described new dyestuffs of the pyrazolone series obtained by combining oxydiazocompounds of the aromatic series (diazoderivatives of orthoaminophenol or orthoaminonaphthol or of their substitution products), or the diazoderivatives of anthranilic acid or of its substitution products with pyrazolones of the benzene or naphthalene series, containing a group "hydroxyl" in the radical "aryl."

I have now found, that the diazoderivatives of amins, which are not substituted by a group "hydroxyl" or "carboxyl" in the position "ortho" relatively to the group "amino," give dyestuffs capable of being chromated and fast to fulling, potting and light, when they are combined with 1-phenyl-3-methyl-5-pyrazolones containing a group "hydroxyl" and a group "carboxyl" in the phenyl radical.

In form of their sodium salts, the new dyestuffs are yellow to red powders, soluble in water with greenish-yellow to red colorations. In alcohol they are difficultly soluble, even when heated, with greenish-yellow to orange-red colorations. They dissolve in concentrated sulfuric acid with greenish-yellow to violet-red colorations. They dye wool in an acid bath greenish-yellow to tile-red tints, which, when chromated, are only slightly changed in color, but become very fast. They are particularly suitable to print cotton with chromium mordants.

The invention is illustrated by the following examples:

Example 1: 9.3 parts of anilin are diazotized and the resulting diazoderivatives is combined with a solution of 32 parts of 1(5'-sulfo-3'-carboxy-2'-oxy)-phenyl-3-methyl-5-pyrazolone, made alkaline with sodium carbonate. The dyestuff is salted out in form of its sodium salt and constitutes a yellow powder, which dissolves in water to greenish-yellow solutions, is difficultly soluble in alcohol, even when heated, with greenish-yellow coloration and dissolves in concentrated sulfuric acid to brownish-yellow to gold-yellow solutions. It dyes wool in an acid bath greenish-yellow tints which, when subsequently chromated, become fast to light, washing, fulling and potting. When printed on cotton with chromium mordants, it gives a very fast greenish-yellow.

Example 2: By combining the diazoderivative of 13.7 parts of meta-aminobenzoic acid with 32 parts of 1(5'-sulfo-3'-carboxy-2'-oxy)-phenyl-3-methyl-5-pyrazolone in a solution made alkaline with sodium carbonate, is obtained a yellow dyestuff which can be salted out and dyes wool pure greenish yellow tints, which become very fast to fulling and potting, when chromated. By printing it with chromium mordants it gives a very pure, fast, greenish-yellow.

Example 3: By substituting in Example 1 for the 9.3 parts of anilin 16.2 parts of 1-amino-2.5-dichlorobenzene, a dyestuff of analogous properties is obtained.

Example 4: 9.3 parts of anilin are diazotized and the resulting diazoderivative is combined with a solution of 26.9 parts of 1(5'-chlor-3'-carboxy-2'-oxy)-phenyl-3-methyl-5-pyrazolone, made alkaline with sodium carbonate. By salting out, the sodium salt of the dyestuff is obtained as a yellow precipitate. It dyes wool in an acid bath, greenish-yellow tints which become fast to fulling and potting, when subsequently chromated. Printed on cotton with chromium acetate, it gives a pure, fast, greenish-yellow.

Example 5: By substituting 13.7 parts of meta-aminobenzoic acid for the 9.3 parts of anilin in Example 4, a yellow dyestuff is obtained, which dyes wool fast greenish-yellow tints and gives also on cotton fast greenish-yellow prints.

Example 6: 13.7 parts of para-aminobenzoic acid are diazotized and the resulting diazoderivative is combined with a solution of 23.5 parts of 1(4'-carboxy-3'-oxy)-phenyl-3-methyl-5-pyrazolone, made alkaline with sodium carbonate. The dyestuff thus obtained dyes wool in an acid bath gold-yellow tints becoming fast, when subsequently chromated. When printed on cotton with chromium mordants, it gives a fast gold-yellow.

Example 7: The dyestuff resulting from 24.4 parts of dianisidine and 65 parts of 1(5'-sulfo-3'-carboxy-2'-oxy)-phenyl-3-methyl-5-pyrazolone dyes wool in an acid bath tile-red tints becoming fast to fulling and potting, when subsequently chromated. When printed on cotton with chromium mordants, it gives a fast red.

What I claim is:

1. The herein described process for the manufacture of azodyestuffs of the pyrazolone series, consisting in combining the diazoderivative of an amin, which is not substituted by a group "hydroxyl" or carboxyl in the position "ortho" relatively to the group "amino" with a 1-phenyl-3-methyl-5-pyrazolone containing a group "hydroxyl" and a group "carboxyl" in the radical phenyl.

2. As new products the herein described azodyestuffs of the pyrazolone series, which constitute in the form of their sodium salts yellow to red powders, soluble in water with greenish-yellow to red colorations, difficultly soluble in alcohol, even when heating, with greenish-yellow to orange-red colorations and dissolving in concentrated sulfuric acid with greenish-yellow to violet-red colorations, dye wool in an acid bath, greenish-yellow to tile-red tints which, when chromated, are only slightly changed in color, but become very fast, and are particularly suitable to print cotton with chromium mordants.

3. As a new article of manufacture the herein described dyestuff derived from diazobenzene and 1(5'-sulfo-3'-carboxy-2'-oxy)-phenyl-3-methyl-5-pyrazolone, which constitutes in the form of its sodium salt a yellow powder soluble in water to greenish-yellow solutions, difficultly soluble in boiling alcohol with a greenish-yellow coloration and soluble in concentrated sulfuric acid with a brownish-yellow to gold-yellow coloration, dyes wool, in an acid bath, greenish-yellow tints becoming, when subsequently chromated, fast to light, washing, fulling and potting, and gives, when printed on cotton with chromium mordants, a pure, fast, greenish-yellow.

In witness whereof I have hereunto signed my name this 12th day of January, 1918, in the presence of two subscribing witnesses.

EMIL REBER.

Witnesses:
 H. E. DISK,
 AMAND REBER.